United States Patent
Chudgar et al.

(10) Patent No.: US 8,429,315 B1
(45) Date of Patent: Apr. 23, 2013

(54) STASHING SYSTEM AND METHOD FOR THE PREVENTION OF CACHE THRASHING

(75) Inventors: Keyur Chudgar, San Jose, CA (US); Satish Sathe, San Ramon, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 118 days.

(21) Appl. No.: 13/167,783

(22) Filed: Jun. 24, 2011

(51) Int. Cl.
*G06F 3/00* (2006.01)
*G06F 13/14* (2006.01)

(52) U.S. Cl.
USPC .............. 710/55; 710/29; 710/305; 711/118; 709/250

(58) Field of Classification Search .................... 710/29, 710/33, 52–55, 305; 711/118, 135; 709/250
See application file for complete search history.

(56) References Cited

U.S. PATENT DOCUMENTS

| | | | | |
|---|---|---|---|---|
| 6,148,082 | A * | 11/2000 | Slattery et al. | 380/212 |
| 6,738,838 | B2 * | 5/2004 | Shemla et al. | 710/38 |
| 6,941,392 | B2 * | 9/2005 | Shemla et al. | 710/35 |
| 7,426,610 | B2 * | 9/2008 | Lakshmanamurthy et al. | 711/118 |
| 7,773,597 | B2 * | 8/2010 | Chen | 370/392 |
| 7,774,522 | B2 * | 8/2010 | Bouvier | 710/55 |
| 7,921,275 | B2 | 4/2011 | Arimilli et al. | |
| 2003/0147409 | A1 * | 8/2003 | Wolrich et al. | 370/412 |
| 2006/0239260 | A1 * | 10/2006 | Chen | 370/389 |
| 2007/0150593 | A1 * | 6/2007 | Singh | 709/226 |
| 2009/0222629 | A1 | 9/2009 | Yano et al. | |
| 2009/0307433 | A1 | 12/2009 | Jones et al. | |
| 2010/0070713 | A1 | 3/2010 | Bercovich et al. | |
| 2010/0077151 | A1 | 3/2010 | Van De Waerdt | |
| 2010/0077154 | A1 | 3/2010 | Chou | |
| 2010/0199275 | A1 * | 8/2010 | Mudigonda et al. | 718/1 |
| 2010/0287137 | A1 | 11/2010 | Lyakhovitskiy | |

OTHER PUBLICATIONS

Pimentel, Andy D., et al.; Hardware vs. Hybrid Data Prefetching in Multimedia Processors: A Case Study; IEEE PCC Conference; Feb. 2000; IEEE; Phoenix; USA.

Hughes, C.J. and Adve, Sarita; Memory-Side Prefetching for Linked Data Structures; Technical Report UIUCDCS-R-2001-2221; May 2001; Univ of IL at Urbana-Champaign; Urbana; USA.

Byna, Surendra; Data Prefetching in an Era of Multicore Processors; www.multicoreinfo.com; Not Dated; USA.

\* cited by examiner

*Primary Examiner* — Christopher B Shin
(74) *Attorney, Agent, or Firm* — Turocy & Watson, LLP

(57) ABSTRACT

In a system-on-chip (SoC) including a processor, a method is provided for stashing packet information that prevents cache thrashing. In operation, an Ethernet subsystem accepts a plurality of packets and sends the packets to an external memory for storage. A packet descriptor is derived for each accepted packet and is added to an ingress queue. Packet descriptors are transferred from the ingress queue to an egress queue supplying the packet descriptors to a processor. A context manager monitors the fill level of packet descriptors in the egress queue. In response to monitoring the fill level, the context manager stashes packets from the external memory into a cache, where each stashed packet is associated with a packet descriptor in the egress queue. Packet descriptors are transferred from the ingress queue to the egress queue in response to a number of packet descriptors in the egress queue falling below the fill level.

13 Claims, 4 Drawing Sheets

STASHING SYSTEM AND METHOD FOR THE PREVENTION OF CACHE THRASHING

BACKGROUND OF THE INVENTION

1. Field of the Invention

This invention generally relates to computer processing and, more particularly, to a system and method for packet processing that prevents the occurrence of cache thrashing.

2. Description of the Related Art

FIG. 1 is a schematic diagram depicting the flow of processing in a conventional packet system (prior art). A major problem in packet processing involves the latency in reading packets stored in an external system memory, such as a double data rate (DDR) memory, for further processing by a central processing unit (CPU) or processor. For incoming packets, the CPU generally allocates a buffer descriptor ring. When packet P1 arrives on the input/output (IO) interface, this packet is copied to system memory and packet-related information such as packet address, packet length, and other information are copied into packet descriptor 1. Then, the IO triggers an interrupt to the CPU. The CPU reads buffer descriptor 1 from the buffer descriptor ring, and finds out information about packet. The CPU issues a read request to the address where the packet is residing in system memory. The CPU is blocked until it gets the data it requested from system memory. Generally, access to system memory is expensive and the latency is in terms of hundreds of nanoseconds. In contrast, the L2 cache latency is about 30 ns and L1 cache latency is on the order of 1-5 ns. This memory read process is performed for every packet, and it introduces significant delay in packet processing.

FIG. 2 is a schematic diagram depicting the use of packet stashing in a packet processing system (prior art). To address the above-mentioned packet data read latency issue, a stashing technique may be used. As in the system of FIG. 1, when the packet P1 arrives on the IO interface, this packet is copied to system memory and packet-related information is copied into packet descriptor 1. The IO triggers an interrupt to the CPU, which reads buffer descriptor 1 and discovers information concerning the packet. Then, the CPU issues a read request to the address where the packet is residing.

The Ethernet interface also sends a sideband signal to the IO bus, indicating that the packet needs to be stashed into the cache. After getting this signal from IO), the CPU system bus copies the packet into the external memory. A cache entry is also created, the packet is copied into the CPU cache, and the cache lines are marked as valid. Then, the IO sends the interrupt, including packet descriptor 1 to CPU. The CPU reads this descriptor to obtain the address of the packet. The CPU issues a read request to the packet address in system memory. The cache controller receives the read request for this address and it finds that the cache lines for this address exist, and that they are valid. So, there is no need to access the packet in system memory. This process reduces system memory latency, which is generally 10 times slower than cache latency.

However, if the packet incoming rate increases faster than the packet processing rate, the stashing process results in cache thrashing. For example, while the CPU is processing packet P1, it is possible that packet P2 is already being copied to system memory by IO and packet descriptor 2 is also prepared. Advantageously, packet P2 already resides in cache before the CPU begins processing it. However, when several packets arrive as a burst, faster than can be processed by the CPU, the CPU cache may become filled with received packets waiting to be processed by the CPU. The IO continues to issue cache stash requests for arriving packets without regard to the full CPU cache status. The caches generally use a LRU (least recently used) algorithm to evict lines and add new lines in cache. As a result, the newer packets being added to cache displace the older, yet to be processed packets. As the CPU always reads packets in order, CPU issues read request for the older packets that are no longer in cache. So, the older packets must be read from system memory, incurring the system memory read latency penalty, while at the same time throwing packets out of the cache. In this scenario, cache trashing causes a greater read latency problem then if no stashing is used.

It would be advantageous if a cache stashing approach could be used for packet processing in a manner that avoided the above-mentioned cache thrashing problems.

SUMMARY OF THE INVENTION

Disclosed herein are a queue manager based system and method for using cache stashing to efficient process packets. The disclosed system removes the latency associated with a CPU read of packet data from system memory, while insuring that there is no cache thrashing occurs when the cache becomes too full.

Accordingly, in a system-on-chip (SoC) including a processor, a method is provided for stashing packet information that prevents cache thrashing, in operation, an Ethernet subsystem accepts a plurality of packets and sends the packets to an external memory for storage. A packet descriptor is derived for each accepted packet and is added to an ingress queue. Packet descriptors are transferred from the ingress queue to an egress queue, which in turn supplies the packet descriptors to a processor. A context manager monitors the fill level of packet descriptors in the egress queue, in response to monitoring the fill level, the context manager stashes packets from the external memory into a cache. Each stashed packet is associated with a packet descriptor in the egress queue.

Packet descriptors are transferred from the ingress queue to the egress queue when the number of packet descriptors in the egress queue falls below the fill level. In one aspect, the packet descriptor fill level is equal to a first number of packet descriptors, corresponding to a cache capacity sufficient to hold an associated first number of packets. If the Ethernet subsystem accepts a total second number of packets, where the second number is greater than the first number, then the second number of packet descriptors is added to the ingress queue. However, only the first number of packet descriptors is transferred from the ingress queue to the egress queue.

Additional details of the above-described method, and a SoC with a system for stashing packet information that prevents cache thrashing, are provided below.

DETAILED DESCRIPTION

Figure 1:
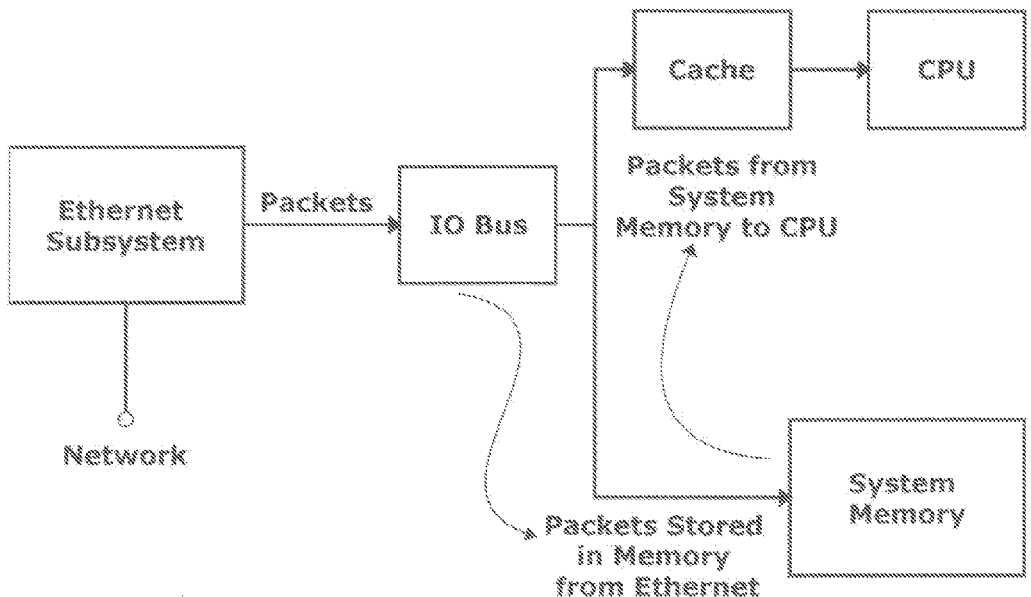
FIG. 1 is a schematic diagram depicting the flow of processing in a conventional packet system (prior art).
Figure 2:
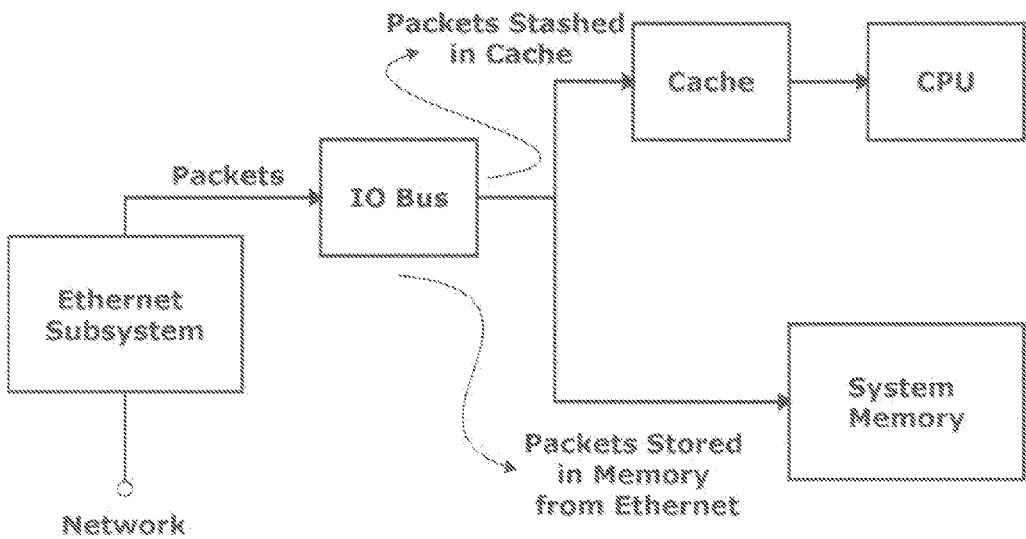
FIG. 2 is a schematic diagram depicting the use of packet stashing in a packet processing system (prior art).
Figure 3:
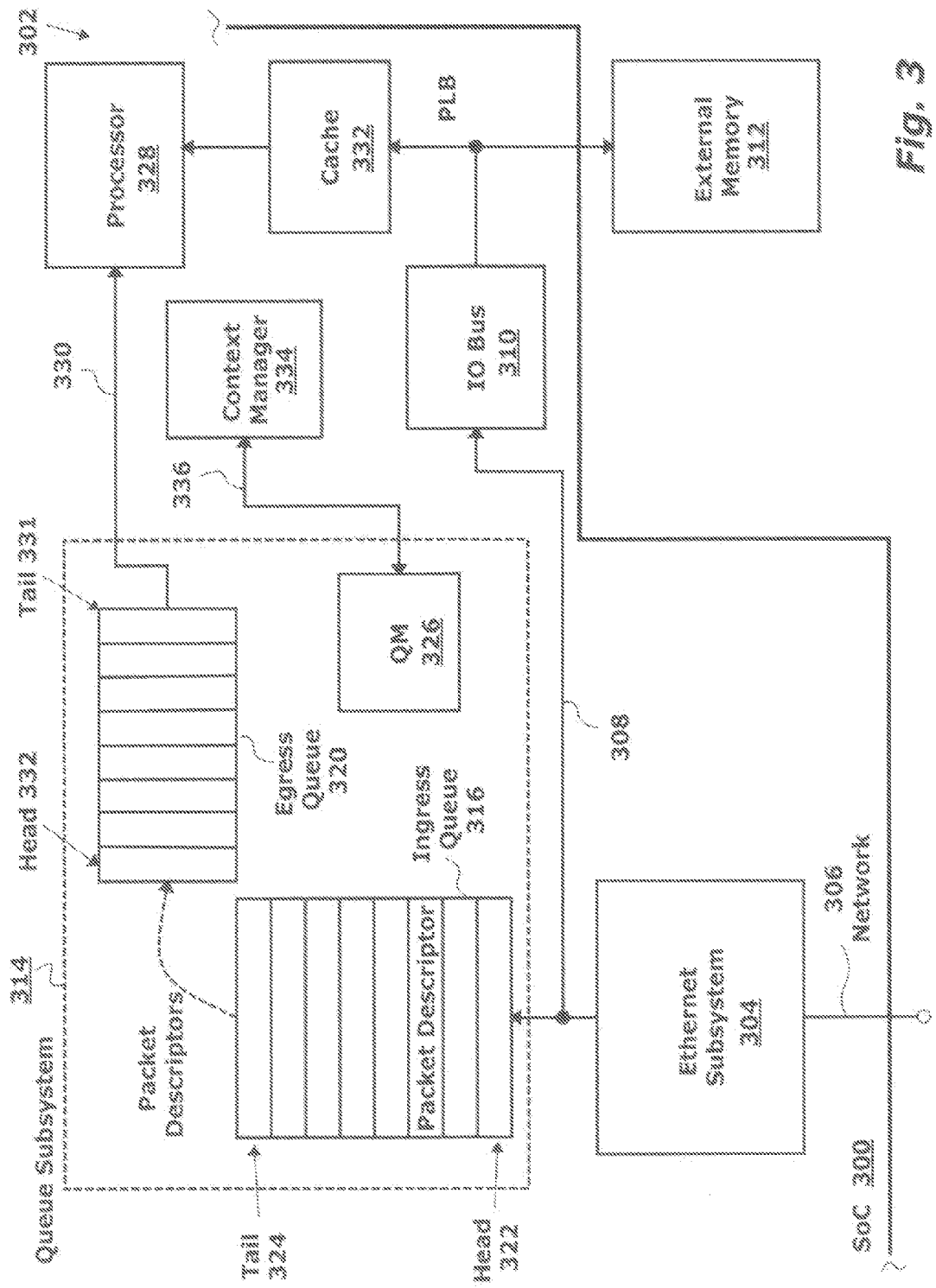
FIG. 3 is a schematic block diagram of a system-on-chip (SoC) including a processor, with a system for stashing packet information that prevents cache thrashing.

FIG. 3 is a schematic block diagram of a system-on-chip (SoC) 300 including a processor, with a system for stashing packet information that prevents cache thrashing. The system 302 comprises an Ethernet subsystem 304 having a network interface on line 306 for accepting a plurality of packets. The Ethernet subsystem 304 derives a packet descriptor for each accepted packet. The Ethernet subsystem 304 has an interface on line 308 connected to an input/output (IO) bus 310 to supply the packet descriptors and to supply the packets to an external memory 312. Typically, the external memory 312 is located off-SoC as shown, but alternatively the memory may be embedded in the SoC. A queue subsystem 314 includes an ingress queue 316 with a head 318 connected to the IO bus 310. An egress queue 320 has a head 322 connected the tail 324 of the ingress queue 316. A queue manager (QM) 326 adds each packet descriptor to the ingress queue 316 and transfers the packet descriptors from the ingress queue 316 to the egress queue 320. Generally, the QM 326 is responsible for managing the flow of packet descriptors into and through the ingress and egress queues.

A processor 328 has an interface on line 330 for accepting packet descriptors from the tail 331 of the egress queue 320. A cache memory 332 has an interface on the IO bus 310 for storing packets. A context manager 334 has a control interface on line 336 connected to the QM 326. The context manager 334 monitors the fill level of packet descriptors in the egress queue (via communications with the QM 326) and stashes packets from the external memory 312 into cache 332 in response to the fill level, where each stashed packet is associated with a packet descriptor in the egress queue 320. More explicitly, the context manager 334 issues commands that result in the stashing of packets from external memory 312 into cache 332.

In one aspect, the Ethernet subsystem 304 embeds an external memory address in a first packet descriptor for an associated first packet. The context manager 334 directs the cache 332 to stash the first packet in response to the first packet descriptor reaching the tail 331 of the egress queue 320. The processor 328 accepts the first packet descriptor from the egress queue 320 and sends a read access for the first packet located at the external memory address. Since the first packet has been stashed in cache 332, the cache 332 is able to deliver the first packet to the processor 328. Note: in one aspect, the packet descriptor includes a pointer to associated state information concerning the destination or connection of the packet to be processed. In this aspect, the associated state information may also be stashed in cache with the packet.

The context manager 334 directs the QM 326 to transfer packet descriptors from the ingress queue 316 to the egress queue 320 in response to the number of packet descriptors in the egress queue falling below the fill level. In one aspect, the context manager 334 monitors a fill level equal to a first number of packet descriptors and the cache 332 has a capacity sufficient to hold the associated first number of packets. For example, the Ethernet subsystem 304 may accept a total second number of packets and derive the second number of packet descriptors, where the second number is greater than the first number. The QM 326 adds the second number of packet descriptors to the ingress queue 316, and the context manager 334 orders the QM 326 to transfer the first number of packet descriptors from the ingress queue 316 to the egress queue 320.

Figure 4:
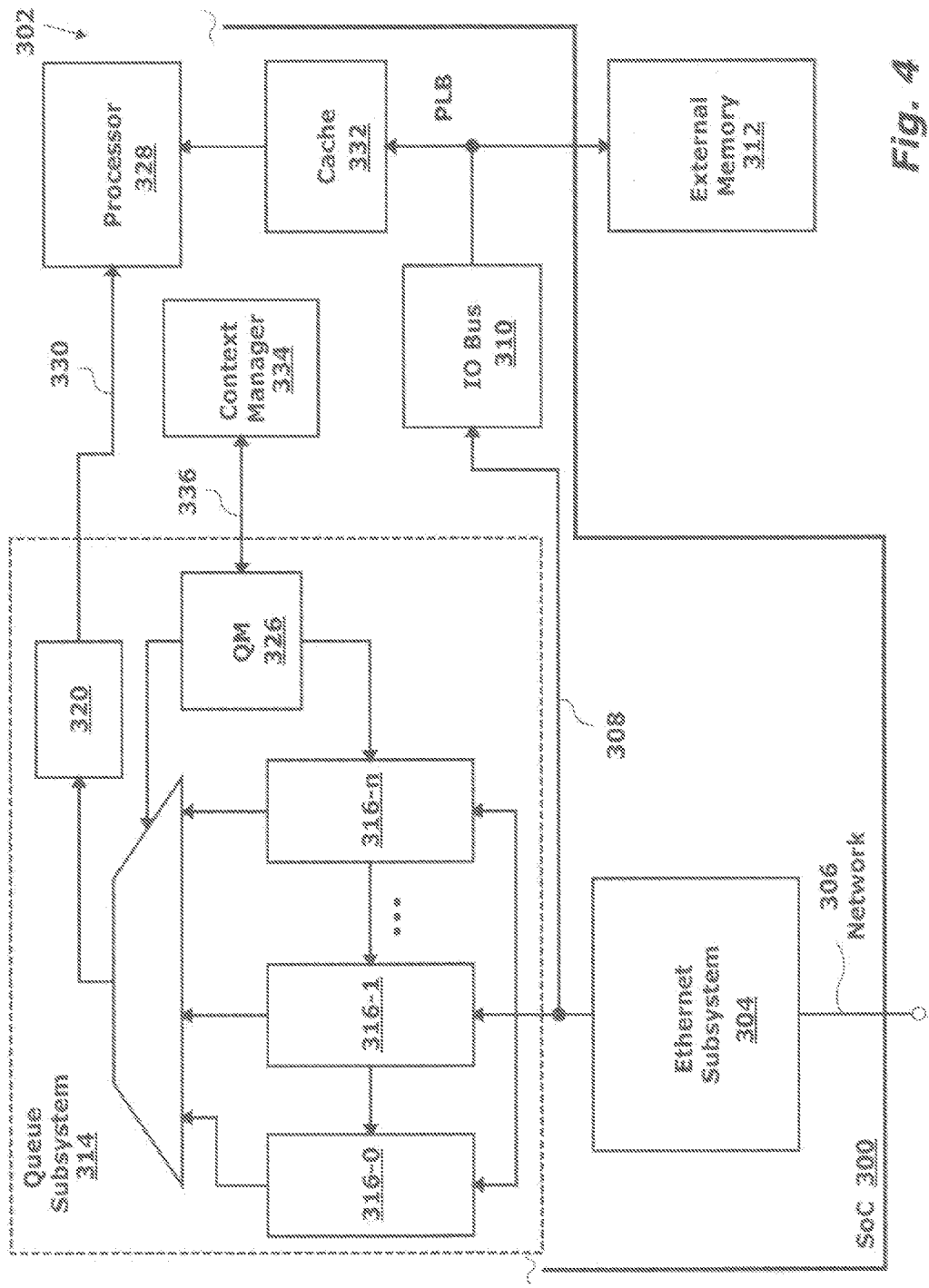
FIG. 4 is schematic block diagram depicting a variation of the system of FIG. 3.

FIG. 4 is schematic block diagram depicting a variation of the system of FIG. 3. The Ethernet subsystem 304 accepts a first group of packets having a high priority and a second group of packets having a lower priority. The Ethernet subsystem 304 adds a stash flag to packet descriptors associated with the first group, indicating that the associated packets are to be stashed, and adds a no-stash flag to packet descriptors associated with the second group, indicating that the associated packets need not be stashed. Alternately, these packet descriptors might be referred to as messages, as they contain more information than a conventional packet descriptor, in this aspect, the ingress queue 316 is a virtual ingress queue with a plurality of parallel physical queues 316-0 through 316-$n$, where n is an integer variable. A first queue (e.g., 316-0) is used for packet descriptors with the stash flag and a second queue (e.g., 316-$n$) is used for packet descriptors with the no-stash flag. The QM 326 gives a higher priority to the transfer of packet descriptors in the first queue 316-0 to the egress queue 320. As a result, the context manager 326 directs the cache to stash packets associated with packet descriptors having the stash flag.

In one aspect, the context manager 334, through interactions with the QM 326, inspects the packet descriptor at the tail of the egress queue 320 to determine the stash bit status. If the stash flag is set to "stash" the associated packet is stashed in cache 332. If the stash flag is set to "no-stash" the associated packet is not stashed. That is, when the processor submits a read access for the "no-stash" packet, the packet is found at an address in the external memory 312, not the cache 332. Note however, that in some circumstances (e.g., low traffic flow) the system may decide stash all packets, regardless of the stash flag setting.

Functional Description

As described above, the Ethernet subsystem works with the queue manager and context manager. The Ethernet subsystem enqueues the messages (packet descriptors) for incoming packets to the context manager in the ingress queue. This is an intermediate step before the processor receives the actual packet for processing. One more queue is defined, which is context manager-to-CPU or egress queue. In this queue, the context manager enqueues (directs enqueuing) and processor dequeues. A sideband signal is given by context manager to the processor local bus (PLB). This is a stash signal to PLB bus with a corresponding address to be stashed. The Ethernet subsystem keeps enqueuing into the ingress queue without issuing any stash signal. The context manager, however, checks the fill level of the egress queue to processor. It enqueues packets in the egress queue only if the fill level is lower than defined threshold. This fill level monitoring ensures that only a limited number of cache lines are used, and as a result, a cache threshing problem cannot occur.

The context manager constantly monitors the ingress queue and the egress queue fill level. If there is a packet in input queue, and if the fill level is below threshold, then this packet descriptor is moved to the egress queue and the associated packet is stashed by issuing a stash sideband signal. When the CPU issues a read command for the packet, it will already be in cache. As the queue fill level is within a defined threshold, there is no cache thrashing. The packet processing latency is decreased because of the successful stashing of packets in cache.

If the stream of packets come in a burst for some reason, the Ethernet subsystem enqueues them all in the ingress queue. As the context manager monitors the queue fill level, it does not transfer enough descriptors to the egress queue to overflow the egress queue. The context manager stashes packets for only those packet descriptors within the defined threshold. For the rest, the packet descriptors are kept in the ingress queue and they are not transferred until the queue fill level drops below the defined limit. This process ensures that the CPU cache doesn't evict the cache lines for older packets to create new lines for newer packets. By keeping the packet descriptors in the incoming queue, packets are not lost, even if they arrive in a temporary burst, and at the same time, the latency of packet processing is reduced by successfully stashing each of them in cache before packet processing starts. By issuing the sideband signal and enqueuing only packet descriptors, it is ensured that there are no multiple direct memory access (DMA) events for the same packet. The packet continues to reside in the same location where it was initially stored in external memory by the Ethernet subsystem.

Since the system uses a queue manager (traffic manager), it becomes possible to stash only selected packets required by system. Using the QM, multiple physical queues can be associated with a single virtual queue. The descriptors in these physical queues contain a bit called 'stash' or 'no stash'. The Ethernet subsystem has an inline classifier which has a packet classification engine. The inline classifier detects certain kinds of packets, which are latency sensitive and need a stashing mechanism to reduce latency. The classifier adds the stash hit for these packets and enqueues them to an appropriate queue. A high priority queue is one of the physical queues, and the QM assigns this queue a strict priority schedule. As a result, the context manager dequeues these packets first, and as the stash bit is set in these packet descriptors, the associated packets are stashed in cache. Other physical queues can be low priority, for packet descriptors without the stashing hit set. These packets can be processed without a concern for latency, and do not require cache stashing.

Figure 5:
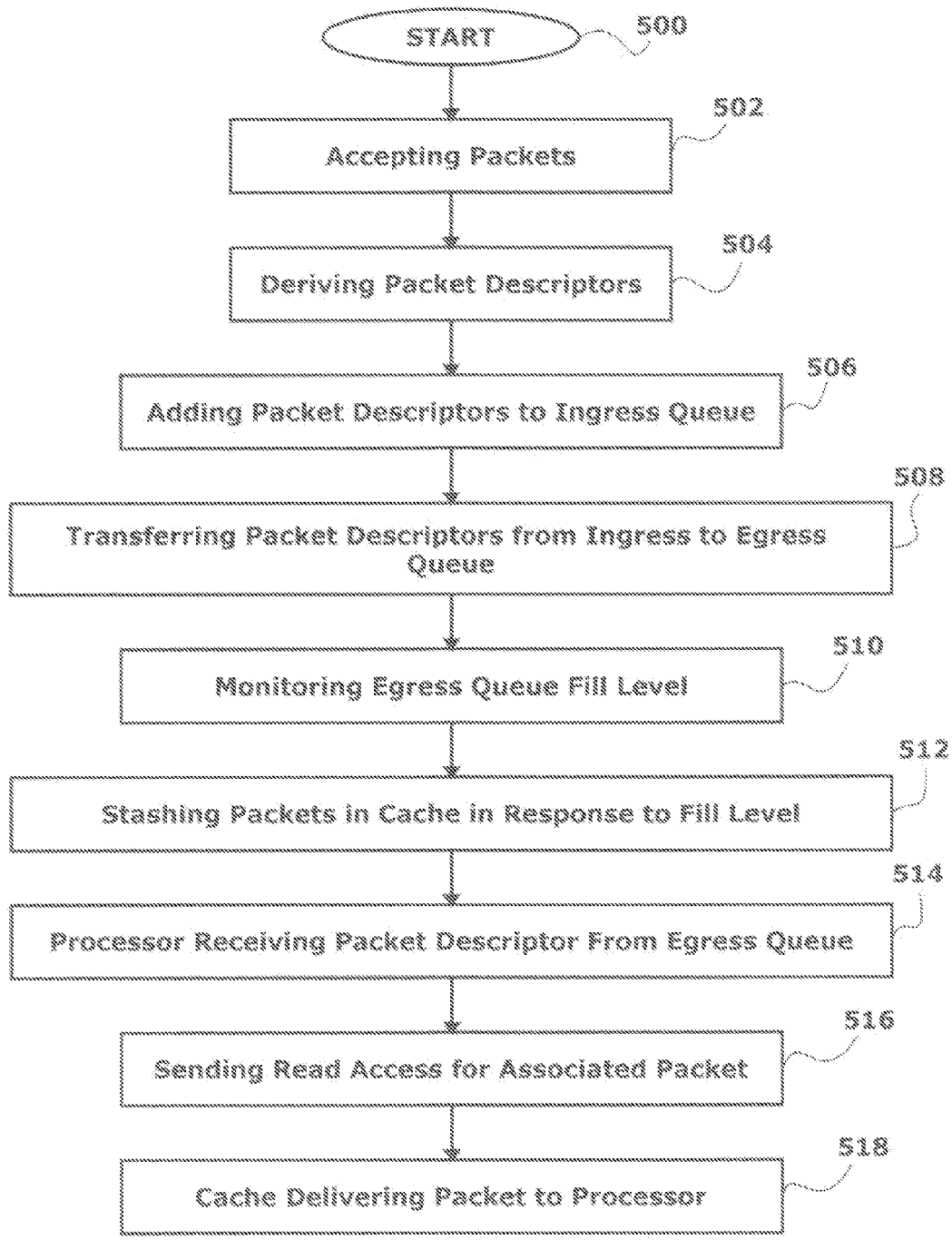
FIG. 5 is a flowchart illustrating a method for stashing packet information that prevents cache thrashing, for use in a SoC with a processor.

FIG. 5 is a flowchart illustrating a method for stashing packet information that prevents cache thrashing, for use in a SoC with a processor. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

In Step 502 an Ethernet subsystem accepts a plurality of packets and sends the packets to an external memory for storage. Step 504 derives a packet descriptor for each accepted packet. Step 506 adds each packet descriptor to an ingress queue. Step 508 transfers the packet descriptors from the ingress queue to an egress queue supplying the packet descriptors to a processor. In Step 510 a context manager monitors a fill level of packet descriptors in the egress queue. In response to monitoring the fill level, the context manager in Step 512 stashes packets from the external memory into a cache, where each stashed packet is associated with a packet descriptor in the egress queue.

In one aspect, transferring the packet descriptors from the ingress queue to the egress queue in Step 508 includes the context manager directing that a packet descriptor be transferred in response to the number of packet descriptors in the egress queue falling below the fill level. The context manager monitoring the fill level of packet descriptors in the egress queue in Step 510 may include the packet descriptor fill level being equal to a first number of packet descriptors, corresponding to a cache capacity sufficient to hold an associated first number of packets.

In another aspect, the Ethernet subsystem accepting the plurality of packets in Step 502 includes accepting a total second number of packets, where the second number is greater than the first number, and deriving the packet descriptor for each accepted packet in Step 504 includes deriving the second number of packet descriptors. Adding each packet descriptor to the ingress queue in Step 506 includes adding the second number of packet descriptors to the ingress queue. Then, transferring the packet descriptors from the ingress queue to the egress queue in Step 508 includes transferring the first number of packet descriptors from the ingress queue to the egress queue.

In one aspect, deriving the packet descriptor for each packet in Step 504 includes embedding an external memory address in a first packet descriptor for an associated first packet, or a pointer to the external memory address. Transferring the packet descriptors from the ingress queue to the egress queue in Step 508 includes transferring the first packet descriptor from the ingress queue to the egress queue, and the context manager stashing packets from the external memory into the cackle in Step 512 includes the context manager stashing the first packet in the cache. In this aspect, the method comprises additional steps. In Step 514 the processor receives the first packet descriptor from the egress queue. In Step 516 the processor sends a read access for the first packet located at the external memory address. Prior to accessing the external memory, in Step 518 the cache delivers the first packet to the processor.

In another aspect, Step 502 accepts a first group of packets having a high priority and a second group of packets having a lower priority. Deriving the packet descriptor for each received packet in Step 504 includes adding a stash flag to packet descriptors associated with the first group, indicating that the associated packets are to be stashed, and a no-stash flag to packet descriptors associated with the second group, indicating that the associated packets need not be stashed. Adding each packet descriptor to the ingress queue in Step 506 includes adding each packet descriptor to a virtual ingress queue with a plurality of parallel physical queues, including a first queue for packet descriptors with the stash flag and a second queue for packet descriptors with the no-stash flag. Transferring the packet descriptors from the ingress queue to the egress queue in Step 508 includes giving a higher priority to the transfer of packet descriptors in the first queue. Then, the context manager stashing packets from the external memory into a cache in Step 512 includes the context manager stashing packets associated with packet descriptors having the stash flag.

A system and method have been provided for cache stashing that avoids the problem of cache thrashing. Examples of particular message structures, processors, and interfaces have been presented to illustrate the invention. However, the invention is not limited to merely these examples. Although the invention has been described in the context of a SoC, it should be understood that the invention may be enabled using discrete component subsystems. Other variations and embodiments of the invention will occur to those skilled in the art.

We claim:

1. In a system-on-chip (SoC) including a processor, a method for stashing packet information that prevents cache thrashing, the method comprising:

an Ethernet subsystem accepting a plurality of packets, and sending the packets to an external memory for storage;

deriving a packet descriptor for each accepted packet;

adding each packet descriptor to an ingress queue;

transferring the packet descriptors from the ingress queue to an egress queue supplying the packet descriptors to a processor;

a context manager monitoring a fill level of packet descriptors in the egress queue; and, in response to monitoring the fill level, the context manager stashing packets from the external memory into a cache, where each stashed packet is associated with a packet descriptor in the egress queue.

2. The method of claim 1 wherein transferring the packet descriptors from the ingress queue to the egress queue includes the context manager directing that a packet descriptor be transferred in response to a number of packet descriptors in the egress queue falling below the fill level.

3. The method of claim 2 wherein the context manager monitoring the fill level of packet descriptors in the egress queue includes the packet descriptor fill level being equal to a first number of packet descriptors, corresponding to a cache capacity sufficient to hold an associated first number of packets.

4. The method of claim 3 wherein the Ethernet subsystem accepting the plurality of packets includes accepting a total second number of packets, where the second number is greater than the first number;
 wherein deriving the packet descriptor for each accepted packet includes deriving the second number of packet descriptors;
 wherein adding each packet descriptor to the ingress queue includes adding the second number of packet descriptors to the ingress queue; and,
 wherein transferring the packet descriptors from the ingress queue to the egress queue includes transferring the first number of packet descriptors from the ingress queue to the egress queue.

5. The method of claim 1 wherein deriving the packet descriptor for each packet includes embedding an external memory address in a first packet descriptor for an associated first packet;
 wherein transferring the packet descriptors from the ingress queue to the egress queue includes transferring the first packet descriptor from the ingress queue to the egress queue;
 wherein the context manager stashing packets from the external memory into the cache includes the context manager stashing the first packet in the cache;
 the method further comprising:
 the processor receiving the first packet descriptor from the egress queue;
 the processor sending a read access for the first packet located at the external memory address; and,
 prior to accessing the external memory, the cache delivering the first packet to the processor.

6. The method of claim 1 wherein the Ethernet subsystem accepting the plurality of packets includes accepting a first group of packets having a high priority and a second group of packets having a lower priority;
 wherein deriving the packet descriptor for each received packet includes adding a stash flag to packet descriptors associated with the first group, indicating that the associated packets are to stashed, and a no-stash flag to packet descriptors associated with the second group, indicating that the associated packets need not be stashed;
 wherein adding each packet descriptor to the ingress queue includes adding each packet descriptor to a virtual ingress queue with a plurality of parallel physical queues, including a first queue for packet descriptors with the stash flag and a second queue for packet descriptors with the no-stash flag;
 wherein transferring the packet descriptors from the ingress queue to the egress queue includes giving a higher priority to the transfer of packet descriptors in the first queue; and,
 wherein the context manager stashing packets from the external memory into a cache includes the context manager stashing packets associated with packet descriptors having the stash flag.

7. In a system-on-chip (SoC) including a processor, a system for stashing packet information that prevents cache thrashing, the system comprising:
 an Ethernet subsystem having a network interface for accepting a plurality of packets, the Ethernet subsystem deriving a packet descriptor for each accepted packet, the Ethernet subsystem having an interface connected to an input/output (IO) bus to supply the packet descriptors and to supply the packets to an external memory;
 a queue subsystem including an ingress queue with a head connected to the IO bus, an egress queue having a head connected a tail of the ingress queue, and a queue manager (QM), the QM adding each packet descriptor to the ingress queue and transferring the packet descriptors from the ingress queue to the egress queue;
 a processor having an interface for accepting packet descriptors from a tail of the egress queue;
 a cache memory having an interface on the IO bus for storing packets; and,
 a context manager having a control interface connected to the QM, the context manager monitoring a fill level of packet descriptors in the egress queue and stashing packets from the external memory into cache in response to the fill level, where each stashed packet is associated with a packet descriptor in the egress queue.

8. The system of claim 7 wherein the context manager directs the QM to transfer packet descriptors from the ingress queue to the egress queue in response to a number of packet descriptors in the egress queue falling below the fill level.

9. The system of claim 8 wherein the context manager monitors a fill level equal to a first number of packet descriptors; and,
 wherein the cache has a capacity sufficient to hold the associated first number of packets.

10. The system of claim 9 wherein the Ethernet subsystem accepts a total second number of packets and derives the second number of packet descriptors, where the second number is greater than the first number;
 wherein the QM adds the second number of packet descriptors to the ingress queue; and,
 wherein the context manager orders the QM to transfer the first number of packet descriptors from the ingress queue to the egress queue.

11. The system of claim 7 wherein the Ethernet subsystem embeds an external memory address in a first packet descriptor for an associated first packet;
 wherein the context manager directs the cache to stash the first packet in response to the first packet descriptor reaching the tail of the egress queue;
 wherein the processor accepts the first packet descriptor from the egress queue and sends a read access for the first packet located at the external memory address; and,
 wherein the cache delivers the first packet to the processor.

12. The system of claim 7 wherein the Ethernet subsystem accepts a first group of packets having a high priority and a second group of packets having a lower priority, the Ethernet subsystem adding a stash flag to packet descriptors associated with the first group, indicating that the associated packets are to stashed, and adding a no-stash flag to packet descriptors associated with the second group, indicating that the associated packets need not be stashed;

wherein the ingress queue is a virtual ingress queue with a plurality of parallel physical queues, including a first queue for packet descriptors with the stash flag and a second queue for packet descriptors with the no-stash flag;

wherein the QM gives a higher priority to the transfer of packet descriptors in the first queue to the egress queue; and, wherein the context manager directs the cache to stash packets associated with packet descriptors having the stash flag.

13. In a system-on-chip (SoC) including a processor, a system for stashing packet information that prevents cache thrashing, the system comprising:

a means for accepting a plurality of packets from a network interface, deriving a packet descriptor for each accepted packet, supplying the packet descriptors via an input/output (IO) bus, and supplying the packets to an external memory via the IO bus;

a means for queuing including an ingress queue with a head connected to the IO bus, and an egress queue having a head connected a tail of the ingress queue, the queuing means adding each packet descriptor to the ingress queue and transferring the packet descriptors from the ingress queue to the egress queue;

a means for processing having an interface for accepting packet descriptors from a tail of the egress queue;

a means for caching having an interface on the IO bus for storing packets; and, a means for controlling cache stashing having a control interface connected to the queuing means, the cache stashing controlling means monitoring a fill level of packet descriptors in the egress queue and stashing packets from the external memory into cache in response to the fill level, where each stashed packet is associated with a packet descriptor in the egress queue.

* * * * *